Nov. 3, 1936.　　　J. A. BIANCO　　　2,059,306
ELECTROMAGNETIC SWITCH
Filed May 22, 1930　　　3 Sheets-Sheet 1
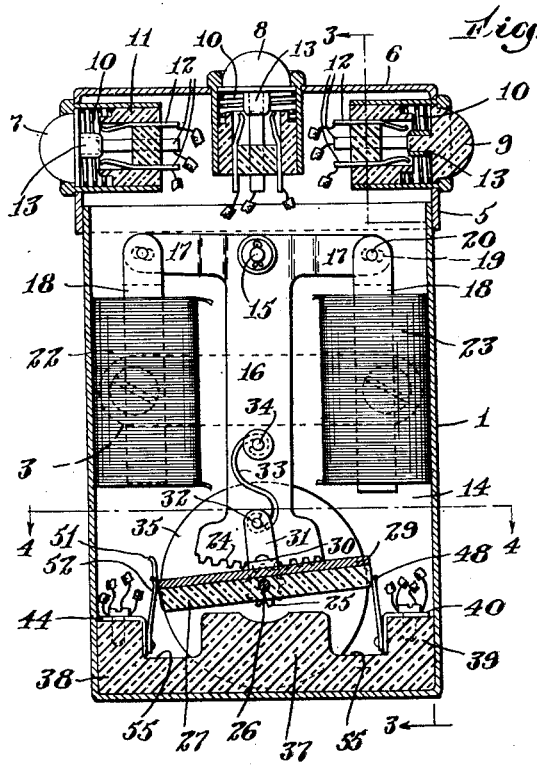
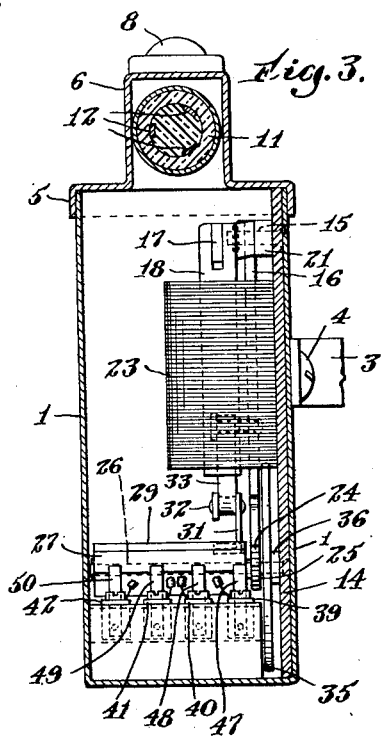
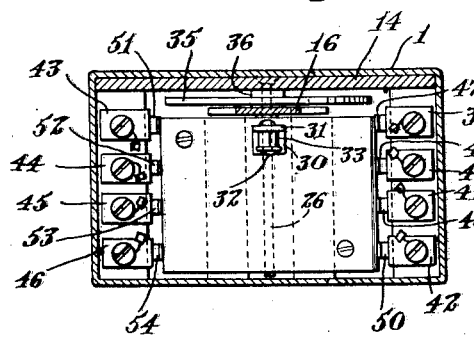
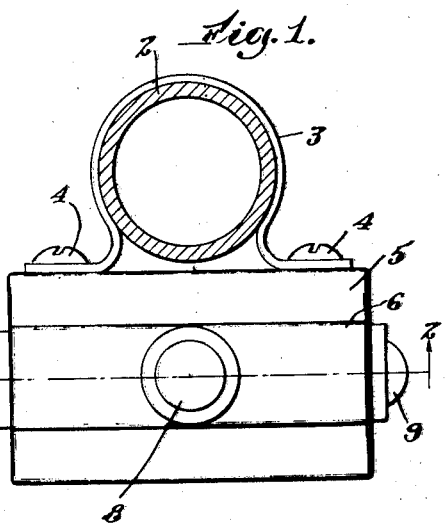
Inventor
John A. Bianco
by James R. Hodder
Attorney

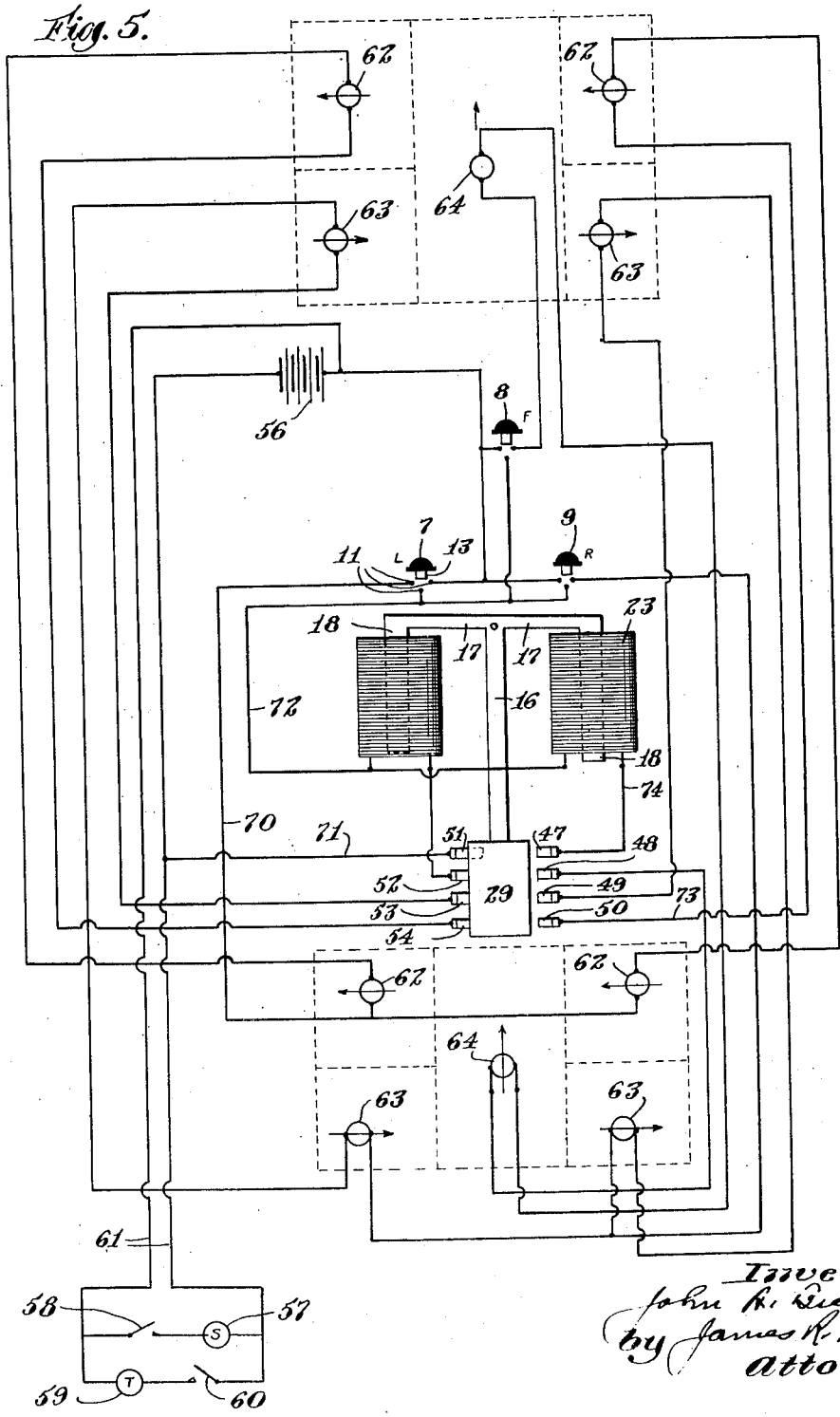

Nov. 3, 1936.    J. A. BIANCO    2,059,306
ELECTROMAGNETIC SWITCH
Filed May 22, 1930    3 Sheets-Sheet 3

Inventor
John A. Bianco
by James R. Hodder
Attorney

Patented Nov. 3, 1936

2,059,306

UNITED STATES PATENT OFFICE 2,059,306

ELECTROMAGNETIC SWITCH

John A. Bianco, Boston, Mass.

Application May 22, 1930, Serial No. 454,669

1 Claim. (Cl. 200—101)

The present invention relates to lighting systems, and includes a novel switch for use in controlling or operating said systems.

In the drawings of the present application I have illustrated the invention as incorporated in an automobile lighting system, wherein a plurality of direction indicators are controlled and operated, but it will be understood and appreciated that this showing is for illustrative purposes, and that the invention is not limited to automobile lighting systems but may be utilized in other fields with equal facility.

When applied to automobiles, an important object of the invention is to provide a plurality of pairs of visual indicating signals, such as arrows, located preferably both at the front and at the rear of the vehicle, and to provide means to alternately illumine the corresponding front and rear lights of each pair. These pairs of lights will preferably indicate left and right turns respectively.

Another object of the invention is to provide other lights, one at the front and one at the rear, to indicate the intention or desire of the motorist to proceed straight forward, and to provide means to illumine these forward indicating lights at one half the frequency of the left and right lights.

Another object of the invention, when applied to automobiles or motor vehicles, is to provide means, readily accessible to the hand of the operator, to enable the operator to selectively operate the desired light circuits.

Thus an operator, in a motor vehicle equipped with my invention, by operating a selected circuit, will be enabled to apprise following vehicles, as well as a traffic officer in front of the vehicle, of the direction in which an operator is desirous of driving his vehicle. Because of the alternate flashing or illumining of the lights in a given circuit, or pair of circuits, greater attention will be drawn to the indicating signals than with the present type of single lights where a steady illumination is provided.

Another and important object of the invention is the provision of a novel switch, utilized to control a predetermined lighting circuit. This switch is manually operated, preferably by means of buttons, but while a predetermined button is depressed, the switch will function automatically to effect the alternate lighting or flashing above briefly mentioned.

The invention may be utilized to control lighting systems on buildings, for example, where alternate lighting effects are desired, and my novel switch may be utilized to control mechanical flashing means, such as shutters, wherein the lights would be continuous, but the shutters would alternately expose the lights of a predetermined signal or predetermined pair of signals.

Other features and objects of the invention reside in the particular construction and arrangement of my novel apparatus and system.

The above and other objects and features of the invention, details of construction, combinations of parts, and advantages, will be hereinafter more fully pointed out, described and claimed.

Referring to the drawings, illustrating a preferred embodiment of my invention,

Fig. 1 is a top plan view of my novel switch affixed to the steering column of a motor vehicle;

Fig. 2 is a vertical sectional view on the line 2—2 of Fig. 1;

Fig. 3 is a vertical sectional view on the line 3—3 of Fig. 2;

Fig. 4 is a cross-sectional view on the line 4—4 of Fig. 2;

Fig. 5 is a wiring diagram of an automobile installation;

Figure 6:
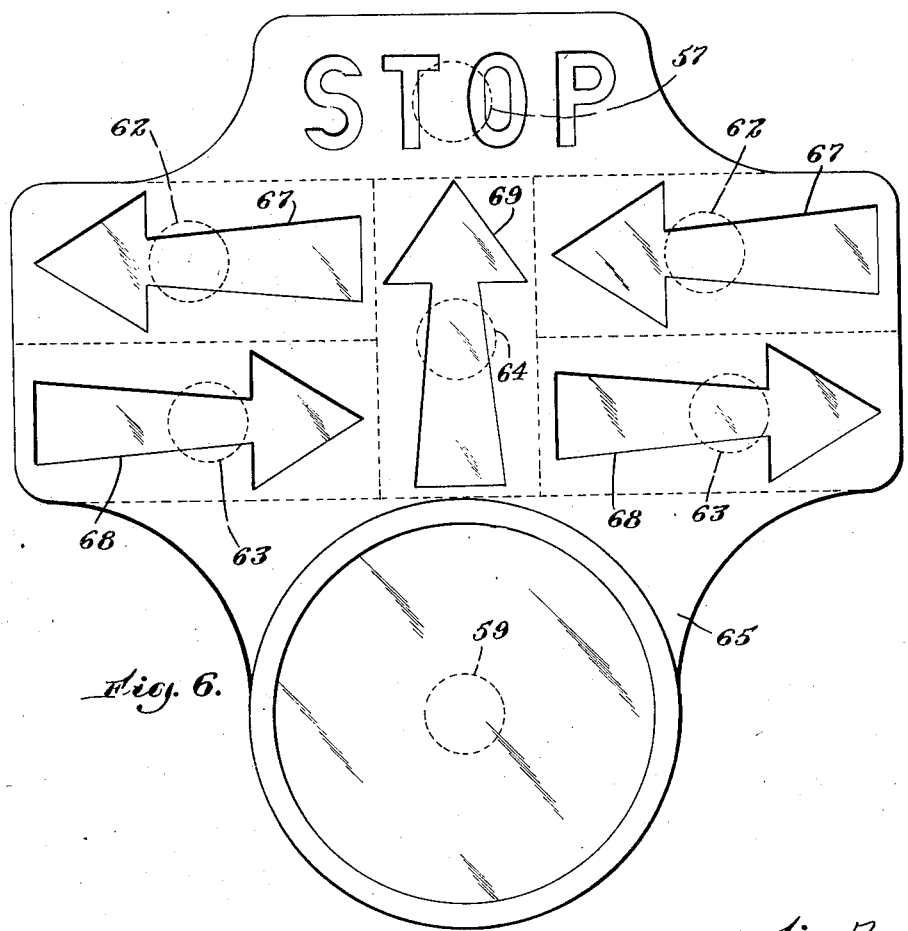
Fig. 6 is a front elevation of an automobile rear light and direction indicator casing.
Figure 7:
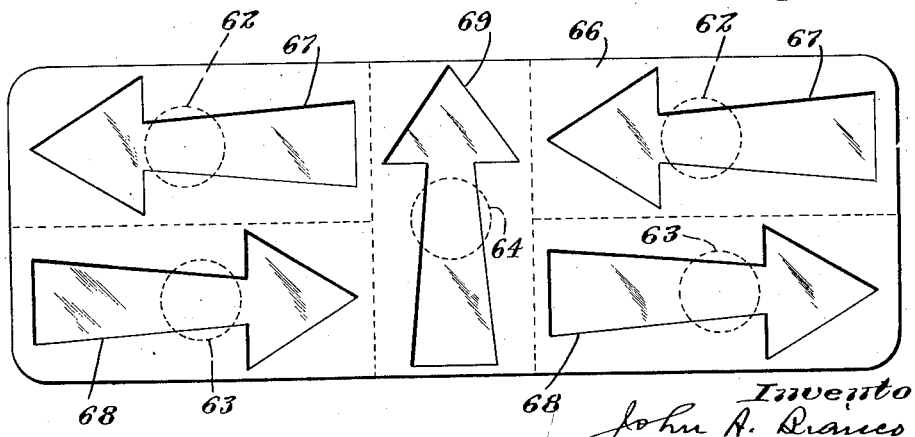
Fig. 7 is a front elevation of an automobile front direction indicator casing.

Referring now to the drawings, for a particular description of the invention, its construction, assembly and operation, I designates a box within which is housed my novel switch. This box is fixed to the steering column 2 of an automobile by a strap 3 which in turn is secured to the box I by screws 4. The box I has a top 5 on which is formed a housing 6 within which are housed the selective switches.

A plurality of buttons 7, 8 and 9 are provided. These buttons are normally held in extended or outward position by coiled springs 10. Within the housing are a plurality of insulating blocks II each containing three spring metal current conducting members, to which the current conducting wires, which will be hereinafter more fully described, are connected.

Each button 7, 8 and 9 has a current conducting contact member 13 adapted, when the button is depressed, to engage with the spring metal current conducting prongs or members 12.

Within the box I is a plate 14 to which is fixed a short shaft or stud 15, on which is pivotally mounted a T-shaped lever 16. To the outer end of each of the arms 17 is pivotally mounted a core 18, forked or yoked at their upper ends, as clearly illustrated. Each of the arms 17 is provided with a slot 19 through which the pivot pins 20 extend. A spacing washer 21 is provided on the shaft 15 to suitably space the T-lever 16 from the plate 14.

Within the box 1 are mounted a pair of solenoids 22 and 23, the cores 18 depending through these solenoids and because of their pivoted connection with the arms 17 said cores will have a vertical movement within said solenoids. The lower end of the T-shaped lever 16 is formed as a gear segment 24 and is adapted to mesh with a pinion 25 mounted on a shaft 26. Also mounted on the shaft 26 is a block 27 of insulating material, and fixed to this block 27 by screws 28 is a plate 29 of current conducting material. Fixed to the plate 29 is the base 30 of a bracket 31 carrying a pin 32. Wrapped partially around the pin 32 is one end of a leaf spring 33, the other end of said spring being partially wrapped around the pin 34 carried by the lever 16. The function of this spring is to hold the block 27 and plate 29 in either position to which they may be tilted or rocked. A fly wheel 35 is provided on the shaft 26 to assist in tilting the block 27 and plate 29. A spacing washer 36 is also provided on the shaft 26 to space the fly wheel 35 from the plate 14.

Located in the bottom of the box 1 is a block 37 of insulating material, and fixed to the shoulders 38 of said block are a plurality of current conducting terminal plates 39, 40, 41, 42, 43, 44, 45 and 46, and to these plates are affixed spring metal current conducting prongs 47, 48, 49, 50, 51, 52, 53 and 54 respectively, the lower ends of the plates and prongs being positioned in grooves or recesses 55 in the block 37.

When my invention is applied to a motor vehicle, as illustrated, in Fig. 5, a battery 56 is utilized as the source of electrical energy, the usual stop light 57 and switch 58 being provided, as well as the tail light 59 and switch 60 therefor, current conducting wires 61 carrying the current from the battery 56 to these lights.

A plurality of bulbs 62 are provided, both at the rear and front of the vehicle, to indicate a left hand turn, and a plurality of bulbs 63 to illustrate a right hand turn. A plurality of bulbs 64 are also provided, one at the front and one at the rear, to designate that the operator intends to proceed in a forward direction. The lights at the rear of the vehicle are housed in a casing 65, and those at the front of the car in a casing 66. Each of these casings is provided with a plurality of arrows or transparent arrow-shaped windows 67 to indicate a left hand turn, a plurality of windows 68 to indicate right hand turns, and each with a window 69 to indicate a forward direction.

It will be noted that the prong 51, connected directly to the battery, is of sufficient length to maintain current conducting contact with the plate 29 regardless of the position to which said plate may be rocked.

The operation of my novel system is simple, and will be readily understood by those skilled in this art, being briefly described as follows:

Assuming that the operator of the vehicle desires to make a left hand turn, he will depress the button 7. This will cause the current conducting contact member 13 on said button to contact with the three current conducting prongs or members 11. Current will then flow through the wire 70 to the lights 62, on the left hand side of Fig. 5, to the current conducting prong 54 in contact with the plate 29, the return to the battery of the current being effected through the prong 51 and wire 71. Simultaneously the current will flow through the wire 72 through the solenoid 22, energizing same and drawing its core 18 downwardly. This will operate the T-shaped lever 16 which in turn will tilt the plate 29, breaking the contact with the prong 54, and bringing said plate into contact with the prong 50, which will in turn conduct current through the wire 73 to the bulbs 62 on the right hand side of Fig. 5. Simultaneously with this lighting of the bulbs 62 on the right hand side of Fig. 5, current will be conducted through the prongs 47 and wire 74 to the solenoid 23, which will in turn be energized and repeat the operation just described. This automatic actuation of the plate 29 will continue so long as the operator keeps the button 7 depressed. Thus an alternate illuminating of the arrows indicating a left hand turn will be effected, rendering the same more attractive and drawing more attention than would be the case if a steady illumination were provided.

Depression of the button 9 will effect a similar alternate flashing or illumination of the bulbs 63 indicating a right hand turn, the operation being the same as just described for the left hand turn, and it therefore not being deemed necessary to repeat the description of said operation for the right hand lights.

It will be noted that the bulbs 64 are only connected through one prong, viz, 48, so that when the button 8 is depressed, the lights 64 will only be illuminated or flashed at one half of the frequency of the lights 62 and 63. In other words, the lights 64 will only be operated when the solenoid 22 is energized, there being no connection with the lights 64 when the plate 29 is in the position illustrated in Fig. 5.

My device is simple, efficient, positive in action, and produces a highly desirable result, and since I believe that both the lighting system, and the switch for controlling the same, are novel, I have claimed both of these features broadly in the present application.

While I have necessarily described my present invention somewhat in detail, it will be appreciated that I may vary the size, shape and arrangement of parts within reasonably wide limits without departing from the spirit of the invention.

My invention is further described and defined in the form of the claim as follows:

An electric switch of the kind described comprising a rocking member having insulating material and electric conducting material on opposite surfaces, the insulating material being of greater thickness than the conducting material, contact members engaging opposite sides of said member and adapted to alternately contact with either the insulating material or conducting material, a pinion secured to said rocking member and a gear in mesh with said pinion, said gear being carried by a rocking lever actuated by solenoids whereby energizing of a solenoid will actuate the lever and rock the member to predetermine the current thru said member to one of said contacts.

JOHN A. BIANCO.